No. 896,544. PATENTED AUG. 18, 1908.
W. S. HUBBARD
APPARATUS FOR AUTOMATIC AND CONTINUOUS GAS ANALYSIS.
APPLICATION FILED FEB. 24, 1908.
5 SHEETS—SHEET 1.

Witnesses
Albert N. Teale.
Walter G. Foot.

Inventor
William Sammons Hubbard
per Herbert Seffin

No. 896,544. PATENTED AUG. 18, 1908.
W. S. HUBBARD.
APPARATUS FOR AUTOMATIC AND CONTINUOUS GAS ANALYSIS.
APPLICATION FILED FEB. 24, 1908.

5 SHEETS—SHEET 3.

No. 896,544.   PATENTED AUG. 18, 1908.
W. S. HUBBARD.
APPARATUS FOR AUTOMATIC AND CONTINUOUS GAS ANALYSIS.
APPLICATION FILED FEB. 24, 1908.

5 SHEETS—SHEET 4.

Fig:4.

No. 896,544. PATENTED AUG. 18, 1908.
W. S. HUBBARD.
APPARATUS FOR AUTOMATIC AND CONTINUOUS GAS ANALYSIS.
APPLICATION FILED FEB. 24, 1908.

5 SHEETS—SHEET 5.

Witnesses
Albert N. Teale.
Walter G. Poole

Inventor.
per. William Sammons Hubbard
Herbert Softin Jones
Attorney

UNITED STATES PATENT OFFICE.

WILLIAM SAMMONS HUBBARD, OF LEICESTER, ENGLAND.

APPARATUS FOR AUTOMATIC AND CONTINUOUS GAS ANALYSIS.

No. 896,544.    Specification of Letters Patent.    Patented Aug. 18, 1908.

Application filed February 24, 1908. Serial No. 417,339.

*To all whom it may concern:*

Be it known that I, WILLIAM SAMMONS HUBBARD, engineer, a subject of the King of Great Britain, residing at Kent Street Works, in the county of Leicester, England, have invented new and useful Apparatus for Automatic and Continuous Analysis and Recording of Gases, of which the following is a specification.

The present invention relates to an improved apparatus for the automatic and continuous analysis of gases and the automatic and continuous recording of the results of the analysis upon a chart or graduated index plate by the apparatus itself.

The special application of my invention which I have at present in view is to record the amount of carbonic acid gas in the chimney gases from a furnace such as a boiler furnace, in such a form that the record will afford a simple and reliable indication of the efficiency of the firing and consequently of the effective working of the boiler. I do not, however, restrict the application of my invention to this purpose alone it being obvious that apparatus constructed in substantially the same manner can be utilized for recording other gases than $CO_2$ in chimneys, flues, exits or other portions of industrial plants.

My invention is more particularly described with reference to the accompanying drawings, in which—

Figure 1:
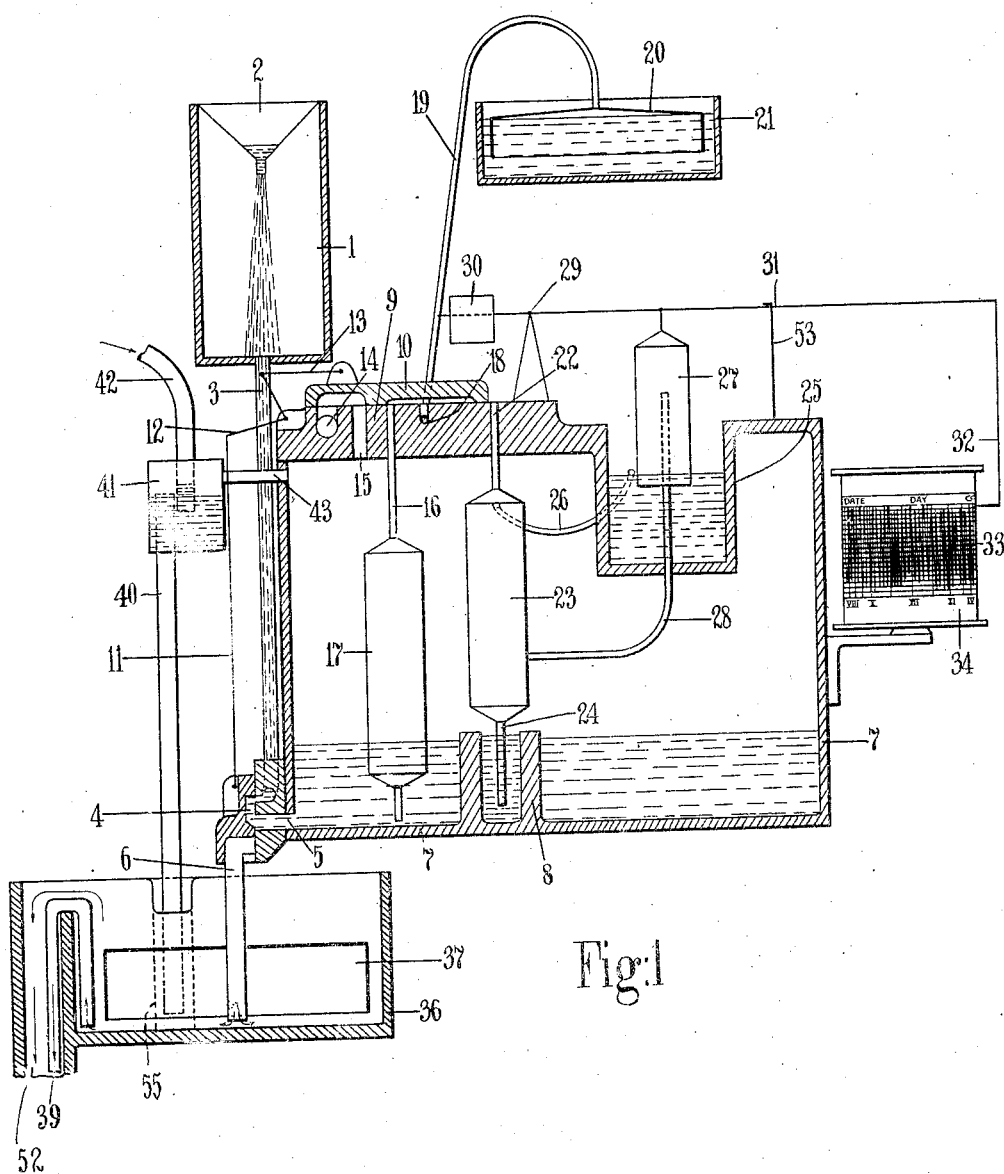
Figure 2:
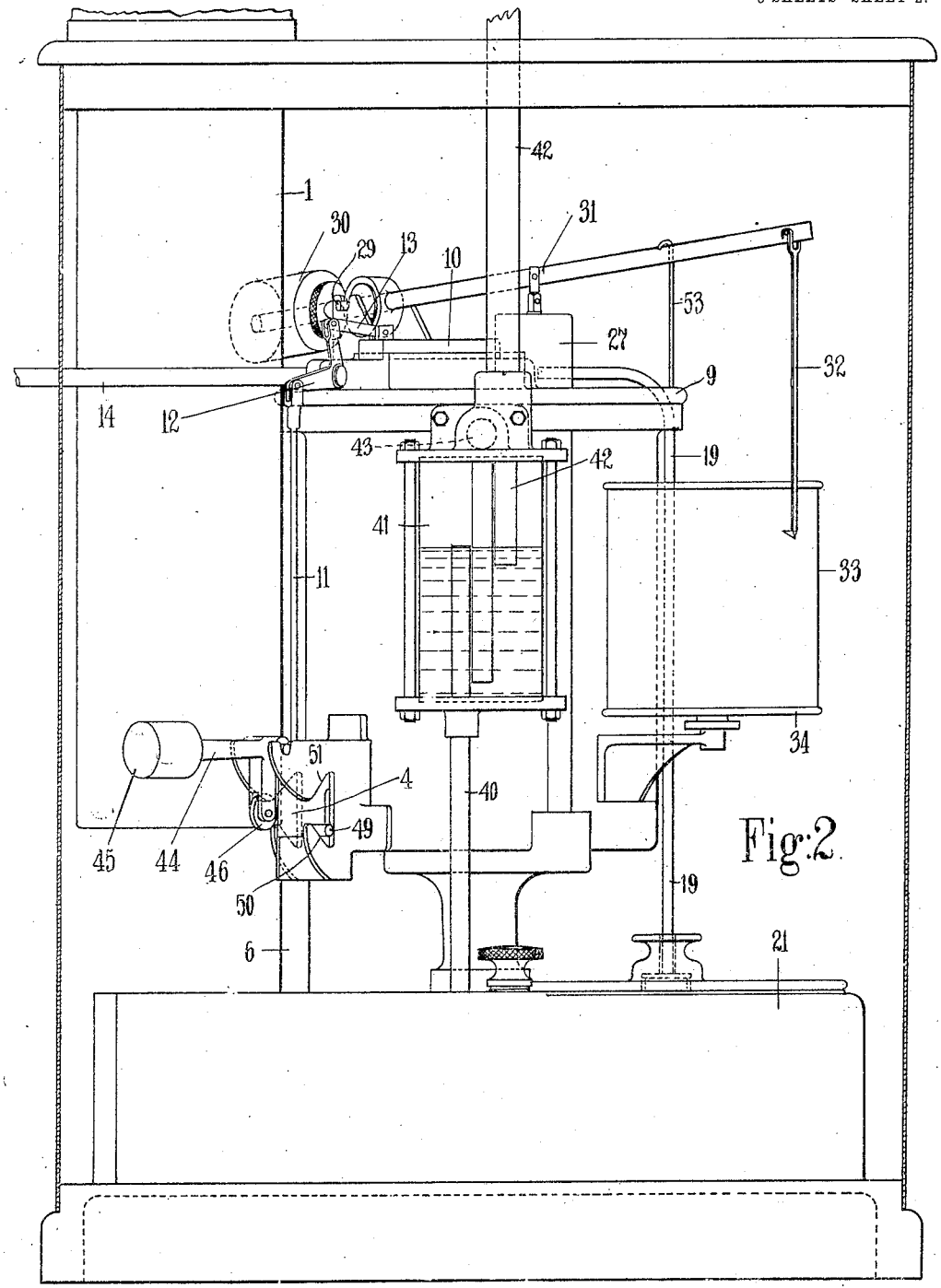
Figure 3:
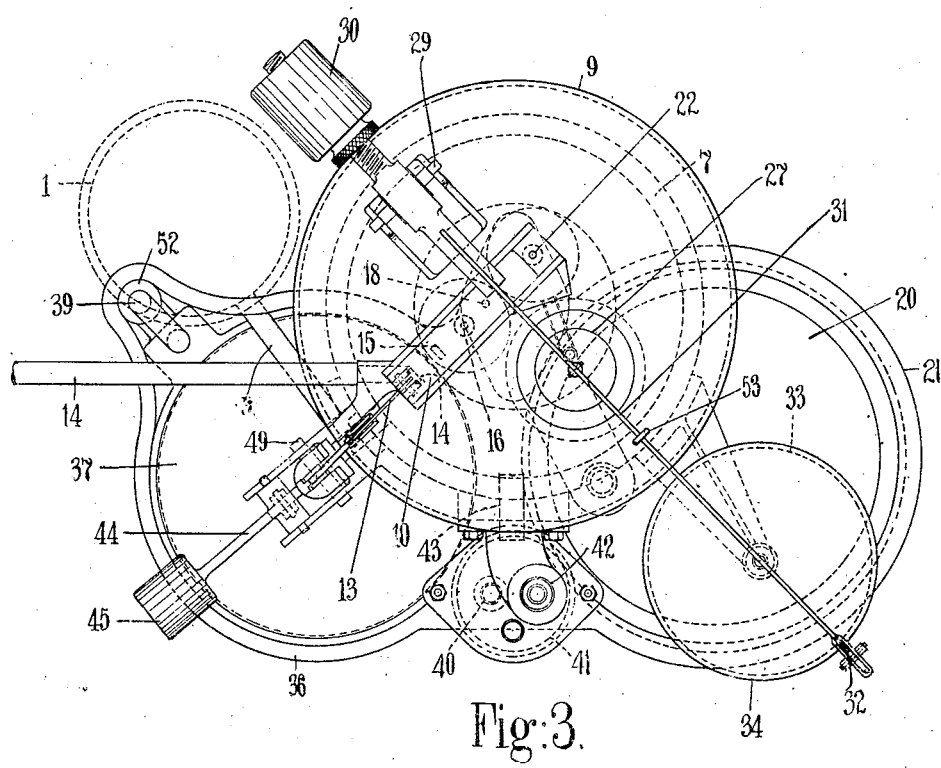
Figure 4:
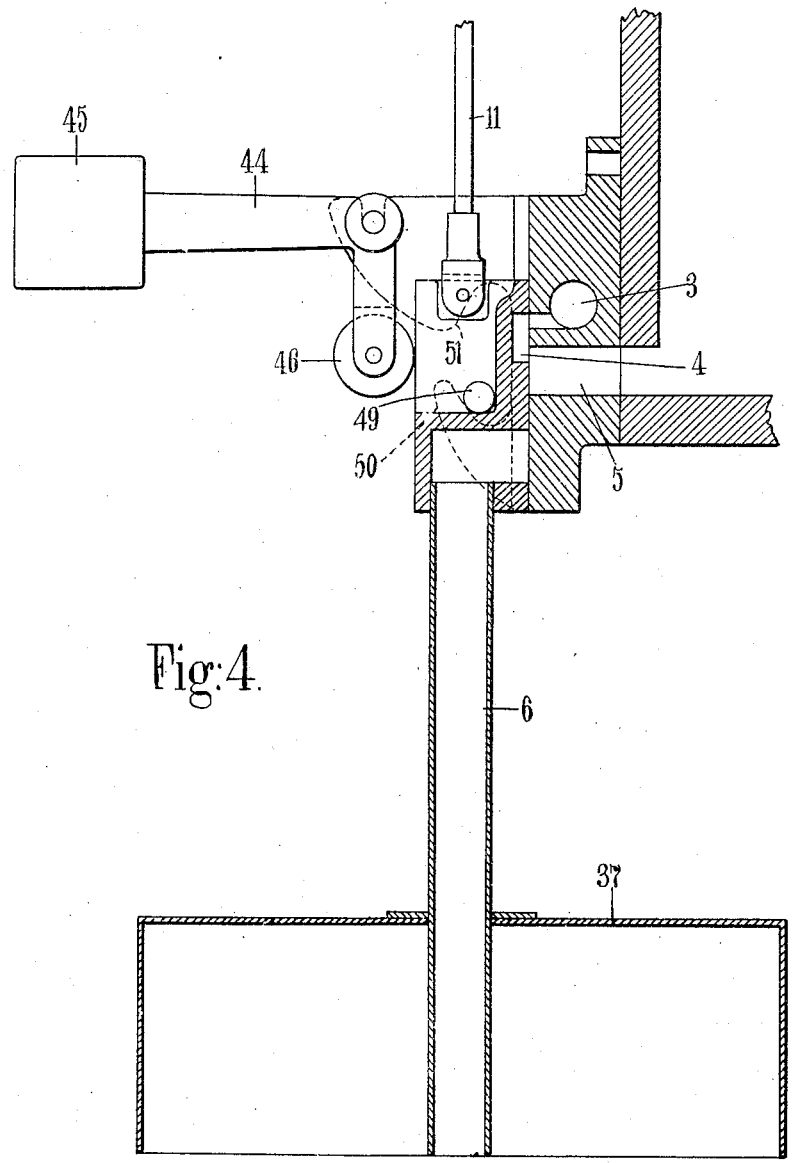
Figure 5:
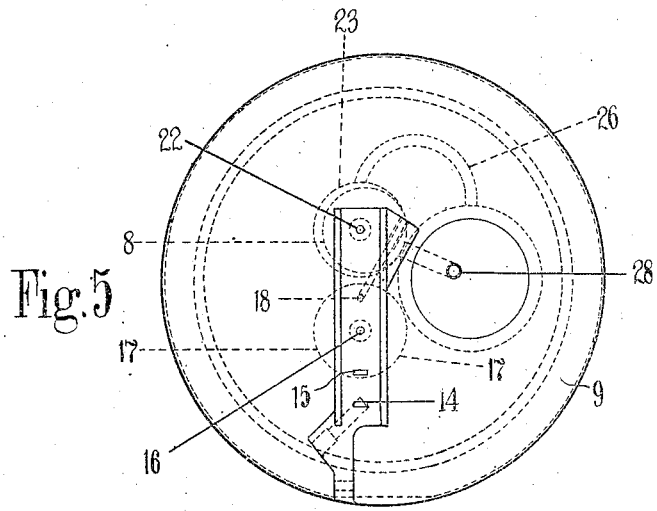
Figure 6:
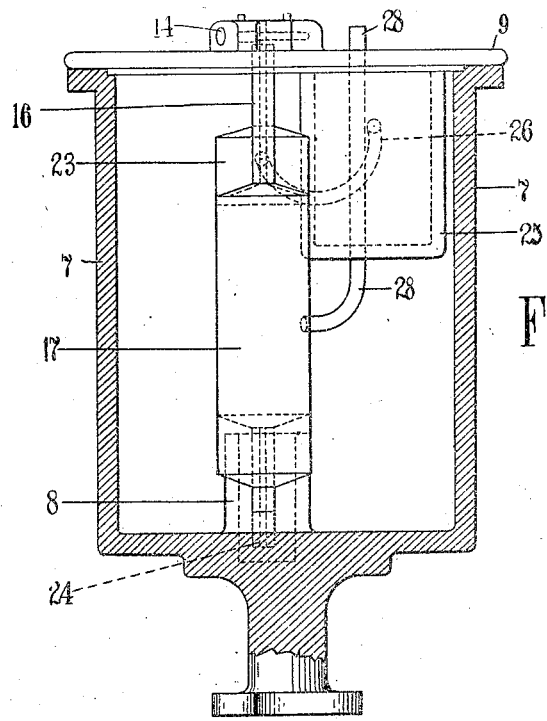

Figure 1 shows a diagrammatic view illustrating for the sake of clearness of description a construction of the apparatus without regard to scale or to the exact relative proportions or positions of the various portions of the apparatus. Fig. 2 shows a front elevation of my apparatus. Fig. 3 shows a plan view of Fig. 2. Fig. 4 shows a detail view of the slide valve adapted to admit water to or let it out from the chamber inclosing the measuring vessels. Fig. 5 shows a plan view of the inclosing chamber, and Fig. 6 shows a side elevation of Fig. 5 partly in section.

Referring now to the drawings, 1, represents a water cistern, preferably provided at the top with an inlet funnel 2, as shown in Fig. 1, through which a regulated flow of water discharges from a cock or valve connected with a source of supply. The water passes down the pipe 3, the lower end of which communicates at right angles with a port or cavity in a sliding valve 4, shown more particularly in Fig. 4. The said sliding valve 4 is arranged according to its position either to connect the pipe 3 with the port 5 at the bottom of the inclosing chamber 7 or to close the lower end of said pipe 3. In order to hold said valve against its seating I arrange, as shown more particularly in Fig. 4, a bell crank 44 provided at one end with a counter weight 45 and at the other end with a roller 46 adapted to be pressed by said weight against the outer surface of said valve 4. The said valve 4 is provided with a pin 49 which limits the stroke of the valve 4 in both directions by pressing against the inclined surfaces 50 and 51. The said port 5 allows a passage for the water from the pipe 3 through the valve 4 to the chamber 7 when said valve is in its lowest position but when said valve is in its highest position it allows an outlet for the water in the chamber 7 down the pipe 6. As shown in Figs. 1 and 6 this inclosing chamber 7 is provided with a tank or retaining chamber 8 adapted to retain a portion of the water when said chamber is emptied. The said chamber 7 is covered by a plate 9 provided with a series of apertures which will be hereinafter described. The said apertures are covered by a sliding valve 10 provided with ports for alternately connecting the various inlets and outlets formed by the apertures and controlled in its movements by the said sliding valve 4 connected thereto by means of the rod 11, bell crank 12 and rod 13. The aperture 14 in the said cover 9 is open to the atmosphere. The aperture 15 is open to the interior of the chamber 7; the aperture 16 is open to the interior of a measuring vessel 17 fixed within said chamber 7, shown in Fig. 1 and in Figs. 5 and 6. The aperture 18 is open to a tube 19 connected with the apex of the coned interior of a bell 20 arranged in a cistern 21 filled almost to the apex of the said coned interior of the said bell 20 with an absorbent liquid. An aperture 22 is open to the interior of a second measuring vessel 23 fixed in said chamber 7 and provided at its lower end with a pipe 24 projecting beneath the level of the water inclosed in the said tank or retaining chamber 8, as shown in Fig. 1 and in dotted lines in Figs. 5 and 6. The said measuring vessel 23 is also connected to a tank 25 by a curved tube 26 and to the interior of a bell 27 floating in said tank 25 by means of another tube 28. The bell 27 carries a balanced lever 31, as shown in Figs. 1, 2 and 3, having its fulcrum at 29 and a balance weight 30. Its other end is provided with a stylus 32, preferably adapted to make a vertical stroke upon the surface of a chart 33 placed upon a revolving drum 34 which is rotated by clock work in any convenient manner. The said pipe 6 which is attached to and adapted to move with the said valve 4 passes to the bottom of a tank 36 through a float 37 to which it is attached. The said tank 36 is provided with an emptying siphon 39. The said tank 36 is provided with an inner tank or water retaining chamber 55, shown in dotted lines in Fig. 1. This retaining chamber 55 forms a water seal for a tube 40 connecting said tank 36 with a cistern 41 adapted to form a water seal for a suction tube 42 connecting said cistern with the flue or chimney from which the gas to be examined is drawn. The said cistern 41 is connected through a pipe 43 with the upper part of the said inclosing chamber 7.

The operation of the apparatus is as follows: Water is allowed to flow into the cistern 1 in a quantity proportioned to the speed at which the instrument is required to analyze the gas and record the result of the analysis. When the valve 4 is in the lowest position, as shown in the diagrammatic view Fig. 1, the water flows down the pipe 3 through the valve and fills the inclosing chamber 7. As the level of the water rises in said inclosing chamber it flows into the measuring vessels 17 and 23 through the open tubes in which said receptacles terminate at their lower ends. The flow of water continues until it reaches the level in the chamber 7 of the overflow pipe 43 from whence the water overflows into the cistern 41 and passes away down the tube 40 into the tank 36. As the said tank 36 fills the float 37 rises therein thereby raising the valve 4 until the pipe 6 is in connection with the interior of the chamber 7 through the port 5 and the end of the pipe 3 is closed thereby shutting off the supply of water from the water cistern 1. The contents of the inclosing chamber 7 flow out through the port 5 down the pipe 6 into the tank 36 and are discharged from there through the siphon 39 and overflow 52 and when the chamber 7 is emptied the water will continue to be discharged from the tank 36 by the siphon 39 until the float 37 has been lowered to its initial position and the valve 4 to the position shown in the diagrammatic drawing Fig. 1 in which the end of the pipe 3 is again open to the inclosing chamber 7 thereby allowing the water to again flow from the cistern 1 to said inclosing chamber.

It will be readily understood that by the arrangement above described as long as the cistern 1 contains water the water will alternately rise and fall in the inclosing chamber 7, the highest and lowest levels in said chamber being regulated by the positions of the port 5 and the pipe 43.

The motion of the valve 4 is communicated by the bell crank lever 12 to the valve 10 so that when said valve 4 is in its highest position the valve 10 is moved so that the connection between the interior of the inclosing chamber 7 and the atmosphere through port 14 is cut off, while a connection is made by the said valve 10 between the upper end of the measuring vessel 17 and the interior of the chamber 7 through the apertures 15 and 16. There is always a communication above the water level with the cistern 41 through the pipe 43, and, as the water level in the inclosing chamber 7 falls, the water passing out through the port 5 the connection of said chamber 7 with the atmosphere being shut off by the valve 10 a partial vacuum is created in said chamber 7 causing an inrush of gas from the flue through the pipe 42, cistern 41 and pipe 43. In this manner the inclosing chamber 7 is filled with a charge of gas from the flue to be analyzed and a portion of this gas fills the measuring vessel 17 through the apertures 15 and 16 connected by the valve 10.

The shape of the measuring vessels 17 and 23 is such that the quantity of gas they receive will be identical in subsequent operations to within a very slight variation because by terminating in narrow tubes a slight variation in the final level of the liquid will not appreciably affect the cubic contents of the said vessels.

The vessel 17 is so arranged that its lower end is unsealed, when the water in the chamber 7 is at its lower level thus allowing it to be entirely emptied of liquid and filled with gas. On the other hand the lower end of the measuring vessel 23 is permanently sealed as it terminates in the tank or retaining chamber 8 which is never emptied of water below a certain level. When the measuring vessel 17 has been filled with gas owing to the emptying of the inclosing chamber 7 the float 37 together with the valve 4 falls again to its initial position bringing the valve 4 to the position shown in Fig. 1 and the valve 10 to the position in which a connection is again made between the atmosphere and the interior of the chamber 7 through the apertures 15 and 14, thus allowing the gases in said chamber 7 which have not passed into the measuring vessel 17 to be discharged into the atmosphere when the water rises in said chamber 7 again. At the same time the upper end of the measuring vessel 17 is cut off from connection with the interior of the chamber 7 and is connected through the valve 10 to the pipe 19 leading to the interior of the bell 20 arranged in the tank 21. As the level of the water in the chamber 7 again rises the gaseous contents of the measuring vessel 17 are gradually forced through the pipe 19 into the underside of the bell 20 and come into intimate contact with the absorbent liquid which may conveniently be caustic alkali. The bell 20 has a comparatively large area and the top is made as thin as possible and the level of the caustic alkali is arranged as shown so that when the gas from the measuring vessel 17 is pressed by the rising water in said vessel under the bell 20 it causes the alkali solution to pass up outside the bell 20 and overflow its top. This arrangement is preferred because it only causes relatively a slight pressure in the pipe 19 and vessel 17 and thus alters the water level in the fine bore tube 16 as little as possible. On the next reversal of the valve 10 the unabsorbed gas from the bell 20 is drawn by the water falling in the vessel 23 through the valve 10 and passages 22 and 18 into the second measuring vessel 23. As the vessel 23 is of slightly larger capacity than the vessel 17 it follows that even if none of the gas which passes into the bell 20 is absorbed there will be a slight vacuum in the second measuring vessel 23 when the water in the chamber 7 reaches its lowest level. As the vessel 23 communicates by means of the pipe 28 with the bell 27 it follows that the slight vacuum created under said bell will cause this to descend.

As the normal position of the stylus or pen on the chart 33 is always above the zero line when a full charge of gas has passed from the absorbing chamber to the second measuring vessel 23 the slight vacuum caused by the difference in size between the measuring vessels only draws sufficient air from underneath the said bell 27 to bring the pen to the zero line. When, however, a considerable portion of the gas is absorbed by the alkali under the bell 20 a greater vacuum is caused in the measuring vessel 23 and the bell 27 thus causing the pen 32 to descend lower and register on the chart 33 the amount of gas absorbed. If desired the action of the pen can be adjusted when setting the instrument by altering the position of the weight 30 on the balanced lever 31. When the valve 10 has been again moved to the position shown in Fig. 1 it uncovers the aperture 22 allowing the contents of the second measuring vessel 23 to be discharged to the atmosphere as the water rises again in the chamber 7 and thus allows said vessel 23 and the under surface of the bell 27 to become in equilibrium again at atmospheric pressure and the pen to rise to the position above zero ready for the next charge.

The movement of the pen lever is controlled by a stop 53 shown more particularly in Fig. 3, adapted to always return it to the same position. The bell 27 is adjusted to only fall according to the difference between the amount of gas received by the first measuring vessel 17 and that received after absorption in bell 20 by the vessel 23; the more gas there is absorbed by the absorbent liquid under the bell 20 the lower the pen 32 descends on the chart.

It will be readily understood that the pipe 24 arranged at the lower end of the second measuring vessel 23 projects beneath the level of the water in the retaining chamber 8 so as to prevent the vacuum caused in the vessel 7 from acting on the bell 27 and thus impairing the accuracy of the instrument. The curved pipe 26 forms a connection between the water in the tank 25 and the top of the measuring vessel 23 by which means the water in said tank 25 is maintained at a constant level in spite of evaporation. The pipe 26 is curved downwards so as to retain a quantity of water and thus prevent the passage of air into the said measuring vessel 23.

The bell 27 is accurately counter balanced on the rod 31 by means of the counter weight 30 and at the other end of said rod is carried the pen 32 adapted to mark upon the chart 33, which chart is gradually turned by the aid of clock work or any well known device. As above described the extent to which the pen 32 marks the chart in its descent depends upon the amount of gas absorbed in the bell 20. In the case under consideration that namely of furnace gases from a boiler flue the length of this mark will be in proportion to the amount of $CO_2$ absorbed; if the furnace is working well and the exit gases contain a large proportion of $CO_2$ the quantity of absorbed gas will be relatively large and the bell 27 will consequently descend further into the tank 25 thus causing the pen 32 to mark a longer stroke on the chart. If, however, the furnace is working badly and only a small proportion of the exit gases is $CO_2$ then the quantity of unabsorbed gas which passes on to the second measuring vessel 23 will be nearly as large as the amount originally received by the first measuring vessel 17 and consequently the fall of the bell 27 will be less and the movement of the pen will be proportionally shorter.

The apparatus is calculated for continuous work for prolonged periods without skilled attention and is adapted to give really reliable indications of the working of the boiler continuously for a lengthy period. The only water seal exposed to the atmosphere is the surface of the liquid in the tank 25 which is maintained at a constant level by the normal working of the apparatus. There is, therefore, no danger of the heat of the boiler house drying up the water in the exposed water seals.

What I claim is:

1. In apparatus for automatic and continuous analysis of gases and the automatic and continuous recording of the results of the analysis upon a chart, the combination of a pair of measuring vessels, a chamber inclosing said measuring vessels, means for filling said chamber and alternately charging said measuring vessels with and emptying said chamber and measuring vessels of the gas to be analyzed, a chamber filled with absorbing liquid, means for alternately connecting said measuring vessels with said absorbent liquid chamber and means for connecting the second measuring vessel with recording apparatus 2. In apparatus for automatic and continuous analysis of gases and the automatic and continuous recording of the results of the analysis upon a chart, the combination of a pair of measuring vessels, a chamber inclosing said measuring vessels, an inner tank adapted to form a water seal for the lower end of the second measuring vessel, means for filling said inclosing chamber and alternately charging said measuring vessels with and emptying said chamber and measuring vessels of the gas to be analyzed, a chamber filled with absorbing liquid, a bell with a coned interior arranged in said chamber adapted to be filled almost to its apex by said absorbent liquid, means for alternately connecting said measuring vessels with the coned interior of said bell and means for connecting the second measuring vessel with recording apparatus.

3. In apparatus for automatic and continuous analysis of gases and the automatic and continuous recording of the results of the analysis upon a chart, the combination of a pair of measuring vessels, a chamber inclosing said measuring vessels, a water cistern adapted to be connected with a source of supply, an exhaust tank, a water valve adapted to be moved to either connect the said inclosing chamber with said water cistern and fill said chamber with water or to connect said inclosing chamber with said exhaust tank and exhaust the water therefrom, means for filling said chamber and alternately charging said measuring vessels with and emptying said chamber and measuring vessels of the gas to be analyzed, a chamber filled with absorbing liquid, means for alternately connecting said measuring vessels with said absorbent liquid chamber and means for connecting the second measuring vessel with recording apparatus.

4. In apparatus for automatic and continuous analysis of gases and the automatic and continuous recording of the results of the analysis upon a chart, the combination of a pair of measuring vessels, a chamber inclosing said measuring vessels, a water cistern adapted to be connected with a source of supply, an exhaust tank, a water valve adapted to be moved to either connect said inclosing chamber with said water cistern and fill said chamber with water or to connect said inclosing chamber with said exhaust tank and exhaust the water therefrom, a bell crank, a roller at one end of said bell crank adapted to press against the outer surface of said valve, a counter-weight at the other end of said bell crank adapted to press said bell crank roller against the outer surface of said water valve and hold said valve against its seating, means for filling said chamber and alternately charging said measuring vessels with and emptying said chamber and measuring vessels of the gas to be analyzed, a chamber filled with absorbing liquid, means for alternately connecting said measuring vessels with said absorbent liquid chamber and means for connecting the second measuring vessel with recording apparatus.

5. In apparatus for automatic and continuous analysis of gases and the automatic and continuous recording of the results of the analysis upon a chart, the combination of a pair of measuring vessels, a chamber inclosing said measuring vessels, a passage arranged in the lower part of said inclosing chamber, a water cistern adapted to be connected with a source of supply, an exhaust tank, a water valve, a pipe connected between said exhaust tank and said water valve, a float attached to said pipe connection adapted to rise and fall in said exhaust tank according to the level of the water therein and to move said valve to either connect the passage in the lower part of said inclosing chamber with said water cistern and fill said chamber with water or to connect said passage through said pipe connection with the exhaust tank, a siphon adapted to empty said exhaust tank, a cistern adapted to form a water seal for a pipe connecting said cistern with the flue or chimney from which the gas to be examined is drawn, a pipe connecting said cistern with the exhaust tank, a pipe connecting said cistern with the upper part of said inclosing chamber, adapted to allow the passage of the gas to be analyzed to pass from the flue through said cistern to said inclosing chamber and the first measuring vessel as said chamber is emptied of water or to allow the water to overflow from said inclosing chamber into said cistern, means for emptying said chamber of gas, a chamber filled with absorbent liquid, means for alternately connecting said measuring vessels with said absorbing liquid chamber and means for connecting the second measuring vessel with recording apparatus.

6. In apparatus for automatic and continuous analysis of gases and the automatic and continuous recording of the results of the analysis upon a chart, the combination of a pair of measuring vessels, a chamber inclosing said measuring vessels, a water cistern adapted to be connected with a source of supply, an exhaust tank, a water valve adapted to be moved to either connect the said inclosing chamber with said water cistern and fill said chamber with water or to connect said inclosing chamber with said exhaust tank and exhaust the water therefrom, means for filling said chamber and alternately charging said measuring vessels with the gas to be analyzed, a chamber filled with absorbent liquid, a plate covering said inclosing chamber, a series of apertures formed in said plate, a sliding valve adapted to close or open said apertures, and to open or close said inclosing chamber to the atmosphere and alternately connect said measuring vessels with said absorbing liquid chamber and means for connecting the second measuring vessel with recording apparatus.

7. In apparatus for automatic and continuous analysis of gases and the automatic and continuous recording of the results of the analysis upon a chart, the combination of a pair of measuring vessels, a chamber inclosing said measuring vessels, a water cistern adapted to be connected with a source of supply, an exhaust tank, a water valve adapted to be moved to either connect the said inclosing chamber with said water cistern and fill said chamber with water or to connect said inclosing chamber with said exhaust tank and exhaust the water therefrom, means for filling said chamber and alternately charging said measuring vessels with and emptying said chamber and measuring vessels of the gas to be analyzed, a chamber filled with absorbent liquid, a plate covering said inclosing chamber, a series of apertures formed in said plate, a sliding valve adapted to close or open said apertures and to open or close said inclosing chamber to the atmosphere and alternately connect said measuring vessels with said absorbing liquid chamber, a bell crank and rod connections transmitting the movement of said water valve to said sliding valve and means for connecting the second measuring vessel with recording apparatus.

8. In apparatus for automatic and continuous analysis of gases and the automatic and continuous recording of the results of the analysis upon a chart, the combination of a pair of measuring vessels, means for alternately charging said measuring vessels with and emptying them of charges of the gas to be analyzed, a chamber filled with absorbent liquid, means for alternately connecting said measuring vessels with said absorbing liquid chamber, an open tank connected with said second measuring vessel, a bell arranged in said tank, a pipe connecting the interior of said bell with the said measuring vessel, a balance lever moved by said bell, a balance weight arranged at one end of said lever, a stylus arranged at the other end of said lever, a drum adapted to be rotated by clock work and a chart mounted on said drum adapted to be marked by said stylus.

In testimony whereof I have signed my name to this specification in the presence of two subscribing witnesses.

WILLIAM SAMMONS HUBBARD.

Witnesses:
ARTHUR J. STEPHENS,
LEONARD E. HAYNES.